United States Patent
Matsuyama

(10) Patent No.: US 7,375,747 B2
(45) Date of Patent: May 20, 2008

(54) METHOD OF DRIVING SOLID-STATE IMAGE PICKUP DEVICE

(75) Inventor: Hisashi Matsuyama, Ryoke-cho (JP)

(73) Assignee: Sanyo Electric Co., Ltd., Osaka (JP)

( * ) Notice: Subject to any disclaimer, the term of this patent is extended or adjusted under 35 U.S.C. 154(b) by 763 days.

(21) Appl. No.: 10/969,050

(22) Filed: Oct. 21, 2004

(65) Prior Publication Data

US 2005/0094013 A1 May 5, 2005

(30) Foreign Application Priority Data

Oct. 31, 2003 (JP) ............................. 2003-372244

(51) Int. Cl.
*H04N 5/262* (2006.01)

(52) U.S. Cl. ................. 348/240.2; 348/240.99; 348/345; 348/230.1; 348/294; 348/311; 348/312

(58) Field of Classification Search ................ 348/317, 348/324, 316, 243, 294, 240.99, 230.1, 311, 348/312

See application file for complete search history.

(56) References Cited

U.S. PATENT DOCUMENTS 6,400,404 B2 * 6/2002 Hirota et al. ............... 348/314
6,744,466 B1 * 6/2004 Furumiya ................... 348/280
7,245,323 B2 * 7/2007 Miyahara .................... 348/316
2003/0063207 A1 4/2003 Noguchi et al.

FOREIGN PATENT DOCUMENTS

KR  2003-0028715  4/2003

* cited by examiner

*Primary Examiner*—Dennis Chow
*Assistant Examiner*—Mekonnen Dagnew
(74) *Attorney, Agent, or Firm*—Oliff & Berridge, PLC

(57) ABSTRACT

In an CCD image sensor, when an image of a partial area is used, a frame rate is enhanced. Horizontal transfer of signal charges of an i-th line read out to a horizontal transfer portion is stopped at the time point when all or a part of a tail portion 74 subsequent to an extraction target portion 72. Under this state, the signal charges of an (i+1)-th line are transferred to the horizontal transfer portion. Thereafter, the horizontal transfer is started. Through this operation, unnecessary signal charges of the tail portion 74 of the i-th line and unnecessary signal charges of a head portion 82 of an (i+1)-th line are combined. By partially overlapping adjacent lines with each other, the cycle number of horizontal transfer clocks required for the horizontal transfer per line can be reduced as compared with a normal operation, thereby enhancing a frame rate.

6 Claims, 5 Drawing Sheets

(related art)

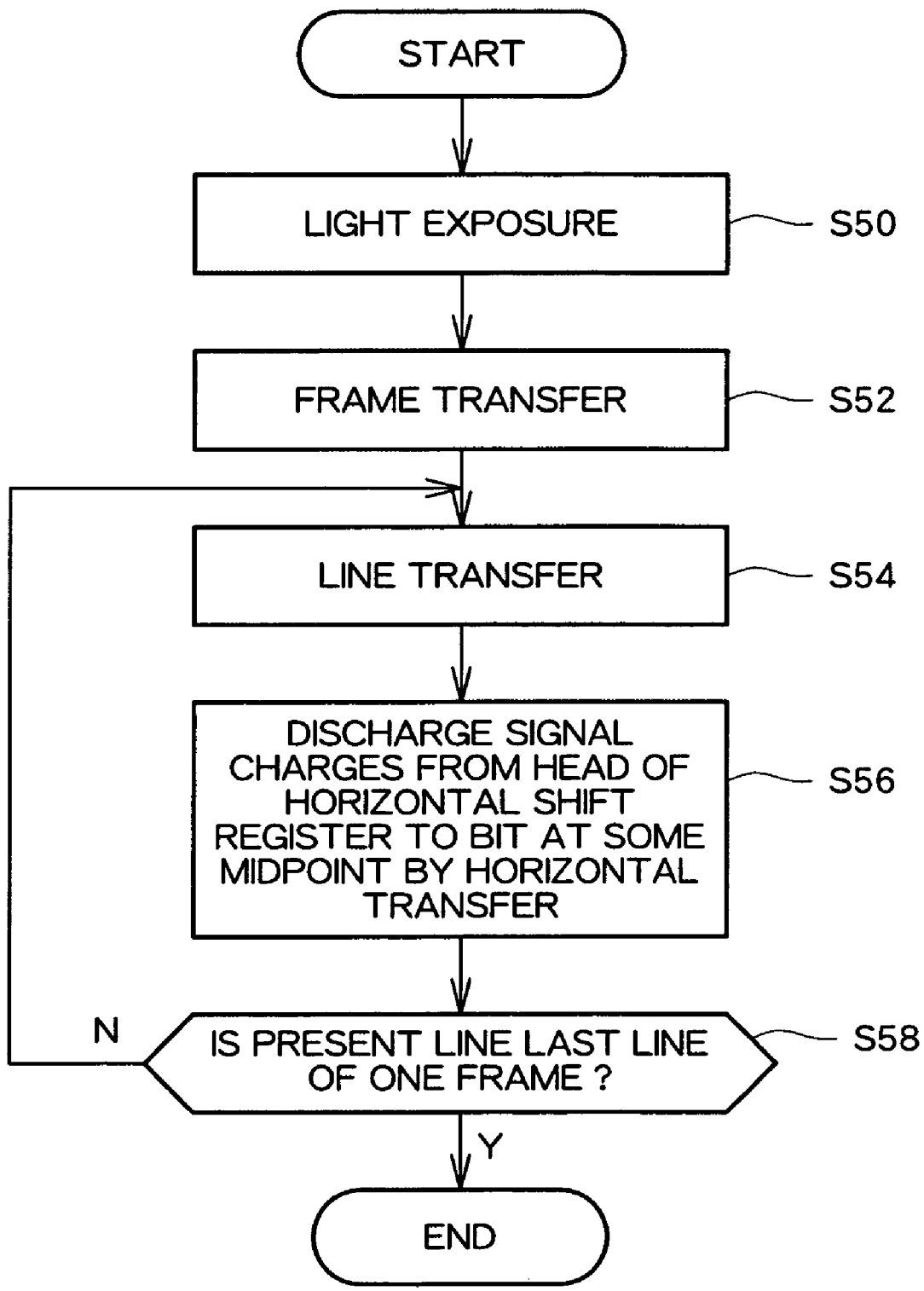

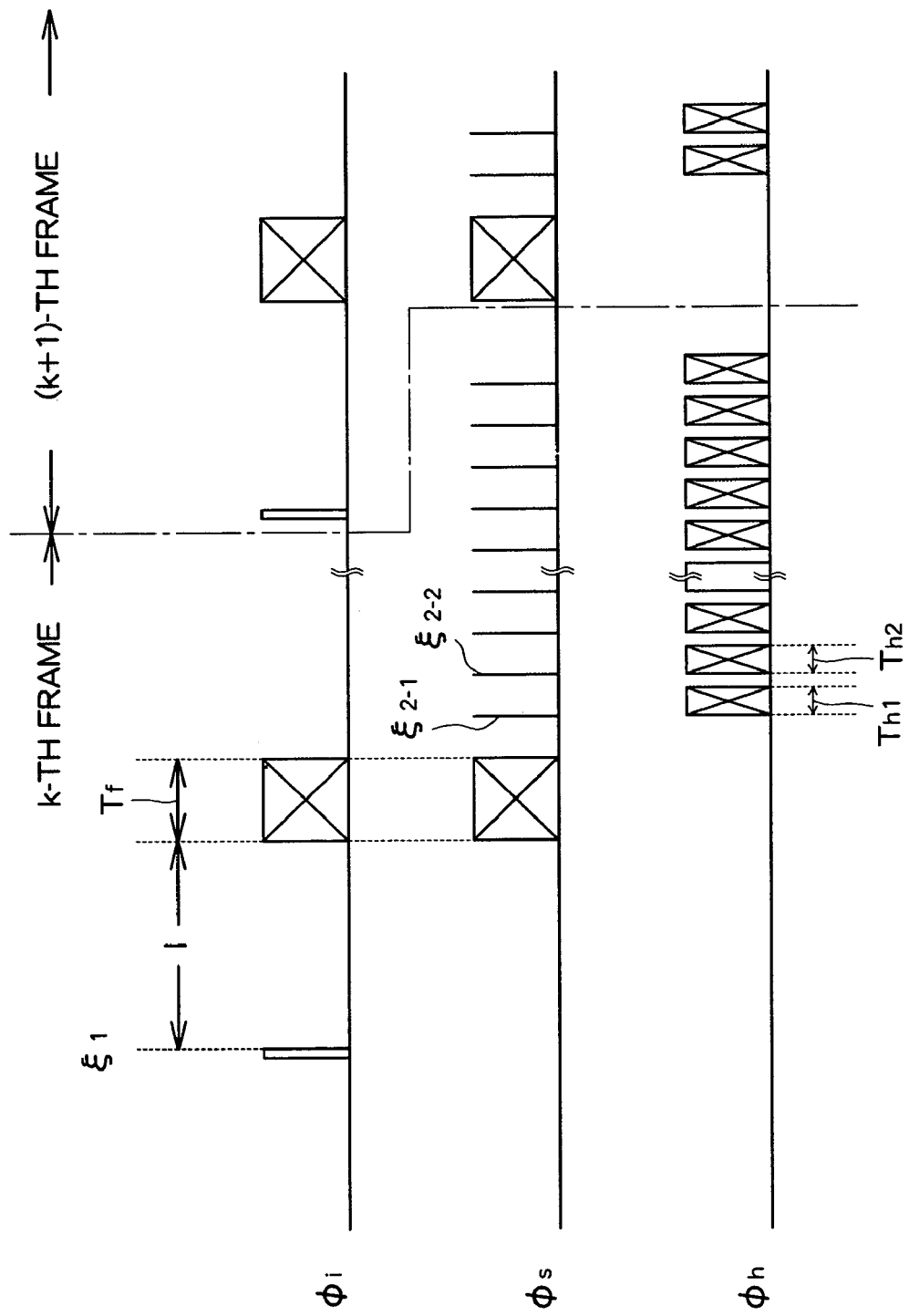

METHOD OF DRIVING SOLID-STATE IMAGE PICKUP DEVICE

CROSS-REFERENCE TO RELATED APPLICATIONS

The priority application Number JP2003-372244 upon which this patent application is based is hereby incorporated by reference.

BACKGROUND OF THE INVENTION

The present invention relates to a method of driving a solid-state image pickup device for transferring and reading signal charges achieved in an image pickup area line by line by a horizontal shift register.

In an image pickup device for generating an image signal by using a solid-state image pickup device or the like, images can be enlarged by not only optical zooming using a lens (optical zoom), but also zooming based on signal processing (digital zoom). Particularly, in the case of an image pickup device using a solid-state image pickup device, in connection with increase in number of pixels of the solid-state image pickup device, sufficient resolution can be achieved even when digital zooming is carried out.

Furthermore, in a solid-state image pickup device using a CCD shift register as means of reading signal charges, signal charges of all the pixels of an image pickup portion are read out as an image signal, and a portion of the image signal which corresponds to an enlargement target area is subjected to the signal processing to perform digital zooming.

Here, a method of driving a solid-state image pickup device for a conventional digital zooming operation will be described by using a frame transfer CCD image sensor as a solid-state image pickup device.

FIG. 1 is a schematic plan view showing a frame transfer CCD image sensor. The image sensor 2 comprises an image pickup portion 2$i$, a charge storage portion 2$s$, a horizontal transfer portion 2$h$ and an output portion 2$d$. Each of the image pickup portion 2$i$ and the charge storage portion 2$s$ comprises plural vertical CCD shift registers. Signal charges accumulated in respective cells of the image pickup portion 2$i$ by light exposure are frame-transferred to the storage portion 2$s$ by the vertical transfer operation of the vertical CCD shift registers. The horizontal transfer portion 2$h$ comprises a CCD shift register, and each bit of the horizontal transfer portion 2$h$ is connected to the output of each of the plural vertical CCD shift registers of the storage portion 2$s$. The signal charges of one frame held in the storage portion 2$s$ are transferred to the horizontal transfer portion 2$h$ line by line. The horizontal transfer portion 2$h$ successively transfers the signal charges of each line to the output portion 2$d$. The output portion 2$d$ receives the signal charges output from the horizontal transfer portion 2$h$ one bit at a time by using capacitance to convert the signal charges thus received to a voltage, and outputs the voltage thus converted as a time-sequential image signal.

According to the conventional driving method, signal charges of an n-th line which are transferred to the respective bits of the horizontal transfer portion 2$h$ are discharged to the output portion 2$d$ in the horizontal transfer mode by the amount corresponding to all the bits, and then signal charges of (n+1)-th line are transferred from the storage portion 2$s$ to the horizontal transfer portion 2$h$. In the prior art, an image signal is generated from the image sensor 2 by reading out the signal charges of all the cells which are achieved by the image pickup portion 2$i$. When an image in a partial area of the image pickup portion 2$i$ is used for digital zooming or the like, a part of the image signal output from the image sensor 2, corresponding to the partial area concerned, is cut out from the image signal in a signal processing circuit disposed at the rear stage of the output portion 2$d$ to generate an image signal corresponding to an enlarges image.

The processing of extracting a partial image of the whole image in the image pickup portion of the solid-state image pickup device can be used for the digital zooming as described above.

Here, in digital cameras and other portable terminals having a camera function, the number of pixels of a solid-state image pickup device is more remarkably enhanced than the number of pixels of a monitor for preview. Therefore, there is a case where when an image is recorded in a recording medium such as a memory or the like, an image is picked up with high resolution corresponding to the number of pixels of a solid-state image pickup device, however, it is sufficient to pickup an image with a small number of pixels which corresponds to the number of pixels of a preview monitor. Furthermore, from the viewpoint of a human visual characteristic, the motion picture does not need resolution which is as high as the still picture, and there is a case where image pickup based on a smaller number of pixels than that of a still picture is selectively carried out in order to reduce the amount of recording data. In these cases, the processing of extracting an image from a part of the image pickup portion of the solid-state image pickup device and using the image thus extracted may be carried out.

In the case of such a situation that only an image of an image extraction target area corresponding to a part of the image pickup portion is used as described above, it has been hitherto general that all the signal charges of all the cells of the CCD image sensor are read out line by line as described above. That is, there has been hitherto such a problem that when an image of a partial area is extracted, signal charges of unnecessary cells must be successively read out through the horizontal transfer portion and it is difficult to keep a sufficient frame rate when a preview is made or motion pictures are picked up. Furthermore, unnecessary cells other than the cells of the image extraction target area must be read out, and thus the number of driving clocks of the horizontal transfer portion is increased by the amount corresponding to the read-out of the unnecessary cells, so that the power is wastefully consumed. Here, if the transfer clock frequency of the horizontal transfer portion is increased, it would be possible in principle to increase the frame rate. However, actually, the transfer efficiency in the horizontal transfer is lowered and thus increase in transfer clock frequency is limited. When a still picture is picked up, if several frames at maximum can be picked up per second, it would be sufficient. Therefore, in this case, it is little required to increase the frame rate. Accordingly, in the case of the image pickup operation of still pictures, it is possible to secure a relatively-long horizontal transfer period even when all the area of the image pickup portion is read out.

As described above, it has been hitherto difficult to increase a frame rate when only an image of an image extraction target area set in a part of the image pickup portion of the solid-state image pickup device is used.

SUMMARY OF THE INVENTION

The present invention has been implemented to solve the above problem, and has an object to provide a method of driving a solid-state image pickup device which can increase a frame rate.

In order to attain the above object, when image information of at least one image extraction target area set in an image pickup area of the solid-state image pickup device is read out from the solid-state image pickup device, a driving method according to the present invention comprises: a line transfer step of vertically transferring signal charges of each of photosensitive pixels arranged in a matrix form in the image pickup area by plural vertical shift registers, and transferring the signal charges from the plural vertical shift registers to a horizontal shift register line by line, and a horizontal transfer step of horizontally transferring the signal charges transferred to the horizontal shift register, wherein with respect to plural extraction target lines which are traverse over the image extraction target area and each of which comprises an extraction target section corresponding to an overlap portion with the image extraction target area, a preceding section preceding to the extraction target section and a subsequent section subsequent to the extraction target section, the horizontal transfer step is stopped while leaving the signal charges of a hold section corresponding to at least a part of the subsequent section in the horizontal shift register, the vertical transfer step vertically transfers a subsequent extraction target line to the horizontal shift register in which the signal charges of the hold section of a preceding extraction target line remain at the head portion, and the length of the hold section is determined on the basis of the length of shorter one of the subsequent section of the preceding extraction target line and the preceding section of the subsequent extraction target line.

When cells which are not required to be read out exist at both the sides in the line direction of the image extraction area, a part of the horizontal transfer operation on these cells is omitted, whereby the time required for the horizontal transfer operation of each line is shortened and thus the frame rate is enhanced. Here, each cell corresponds to a pixel respectively. The preceding section and the subsequent section correspond to the cells which are not required to be read out on one line, and cells which belong to the image extraction target area and are to be read out constitute the extraction target section. In the horizontal transfer, the preceding section is transmitted to the output portion prior to the extraction target section, and the subsequent section is transferred to the output portion subsequently to the extraction target section. The horizontal transfer to the signal charges of an n-th which are line-transferred to the horizontal shift register is stopped at the time point when the signal charge at the end of the extraction target section is transferred to the output portion or the signal charges until some midpoint of the subsequent section have been transferred to the output portion. Accordingly, all or a part of the subsequent section of the n-th line is left at the head portion of the horizontal shift register. The length of the hold section remaining in the horizontal shift register is set to be equal to or less than the length of the preceding section of an (n+1)-th line. When the line transfer of the signal charges of the (n+1)-th line is carried out, the signal charges of the residual subsequent section of the n-th line and the signal charges of the preceding section of the (n+1)-th line are combined with each other on the horizontal shift register, and the horizontal transfer of the (n+1)-th line is carried out until some midpoint of the line as in the case of the n-th line. According to this operation, the number of horizontal transfer bits per line is reduced to be smaller than the number of cells constituting one line, and thus the horizontal transfer period is shortened without increasing the frequency of the horizontal transfer clock, thereby enhancing the frame rate. Here, the length Nr of the hold section is determined on the basis of shorter one of the length Nh of the subsequent section of the n-th line and the length Nt of the preceding section of the (n+1)-th line. That is, in the case of Nh≧Nt, it can be established that 0<Nr≦Nt (≦Nh). In the case of Nh<Nt, it can be established that 0<Nr≦Nh. Since Nr≦Nh, the signal charges which are combined in the horizontal shift register when the subsequent line is line-transferred are derived from unnecessary preceding section and subsequent section, and thus the required signal charges of the extraction target section are read out from the output portion without being combined with other signal charges.

According to the driving method of the present invention, it is preferable that the length of the hold section is set to the length of shorter one of the subsequent section of the preceding extraction target line and the preceding section of the subsequent extraction line.

BRIEF DESCRIPTION OF THE DRAWINGS

FIG. 3 is a flowchart showing a method of driving the CCD image sensor in an image extraction mode according to an embodiment of the present invention;

FIG. 4 is a timing chart showing the method of driving the image sensor in the image extraction mode according to the embodiment of the present invention.

DESCRIPTION OF THE PREFERRED EMBODIMENT

A preferred embodiment according to the present invention will be described hereunder with reference to the accompanying drawings.

Figure 1:
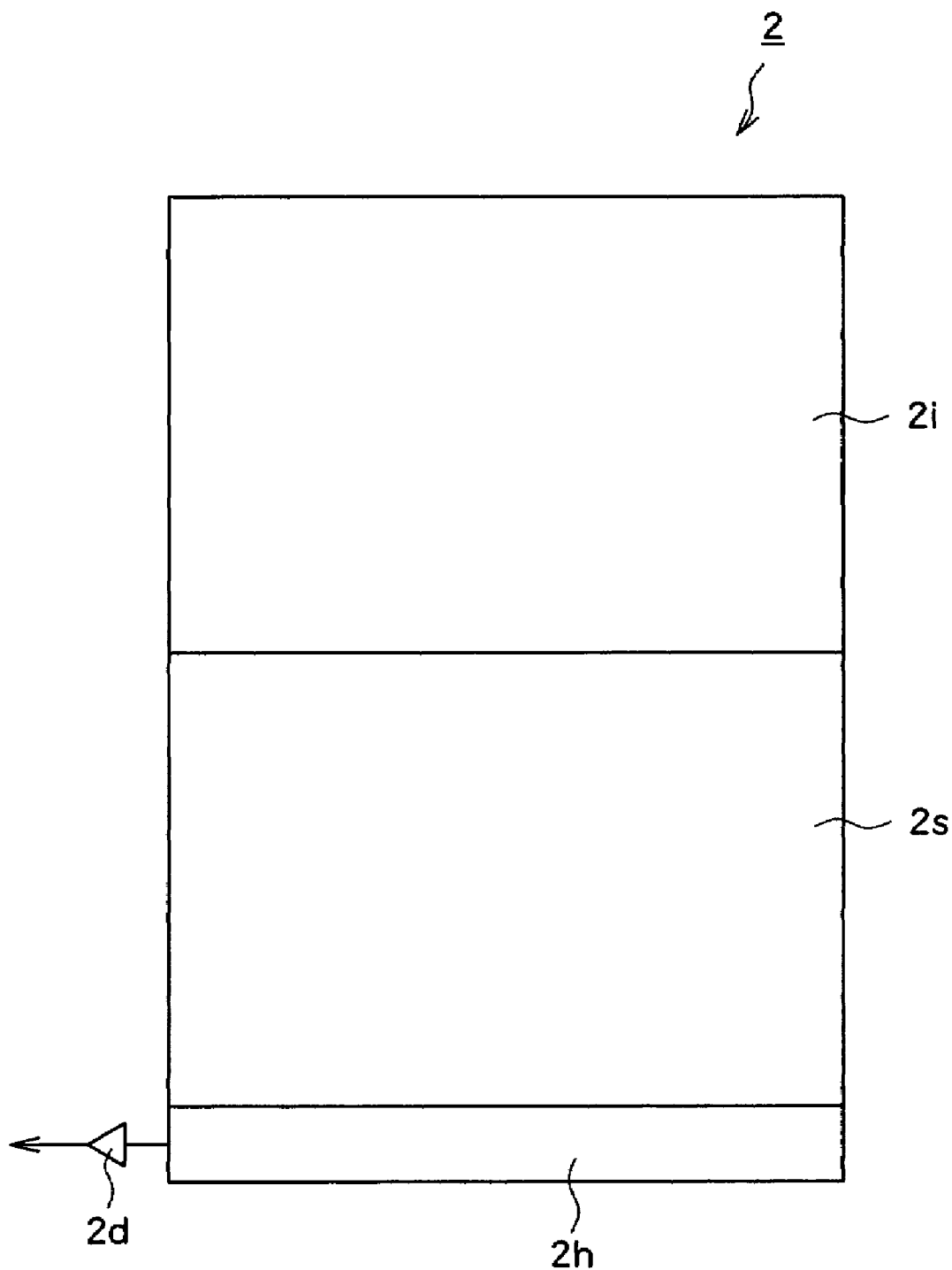
FIG. 1 is a schematic plan view showing a frame transfer CCD image sensor.
Figure 2:
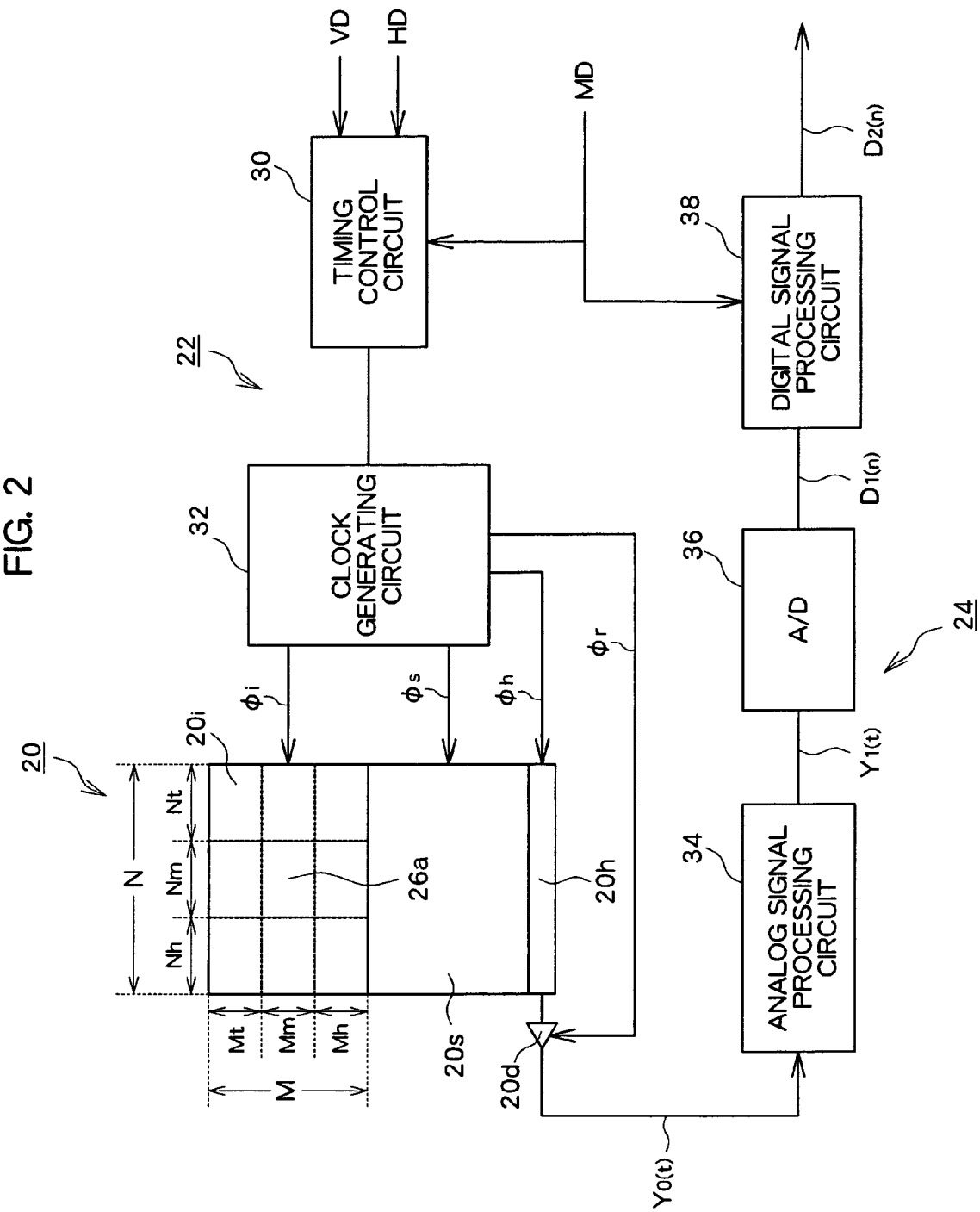
FIG. 2 is a block diagram showing the construction of an image pickup device using an image sensor.

FIG. 2 is a block diagram showing the construction of an image pickup device using an image sensor 20. The device comprises an image sensor 20 which is a frame transfer CCD image sensor, a driving circuit 22 for driving the image sensor 20 and a signal processing circuit 24 for processing an image signal output from the image sensor 20.

The image sensor 20 is a frame transfer CCD image sensor, and it is equipped with an image pickup portion 20$i$, an storage portion 20$s$, a horizontal transfer portion 20$h$ and an output portion 20$d$ which are formed on the surface of a semiconductor substrate. The present invention may be applied to an interline transfer CCD image sensor and a frame interline transfer CCD image sensor. The image sensor 20 is used in an application of picking up high-resolution still images by using all the cells of the image pickup portion 20$i$, for example. In a case where high resolution is not required, the image sensor 20 may be used in an application of enlarging and displaying a center portion of an image picked up by the image pickup portion 20$i$. The image pickup of only the image of the center portion of the image pickup portion 20$i$ is suitably used to display on a preview screen, pick up motion pictures, etc.

The image pickup portion 20i and the storage portion 20s comprise vertical CCD shift registers whose channels are continuous to one another in the column direction, and a plurality of vertical CCD shift registers as described above are arranged in the line direction (horizontal direction on the image) in the image pickup portion 20i and the storage portion 20s. These vertical CCD shift registers are equipped with gate electrodes each of which is bridged in the line direction on the substrate and a plurality of which are arranged in parallel in the column direction, and clocks which are deviated in phase are applied to the gate electrodes, whereby the signal charges of the respective cells are vertically transferred in the vertical CCD shift registers. In the image sensor 20, a three-phase clock $\phi_i$ is supplied to the image pickup portion 20i, and a three-phase clock $\phi_s$ is supplied to the storage portion 20s, thereby controlling the storage and transfer of the signal charges in the image pickup portion 20i and the storage portion 20s.

The cell constituting each bit of the vertical CCD shift registers of the image pickup portion 20i generates and accumulates signal charges in accordance with incident light. The cells are arranged in a matrix form in the pick up portion 20i, and the number of the cells disposed in the line direction out of the matrix-arranged cells is represented by N, and the number of the cells disposed in the column direction is represented by M. A rectangular center area 26a is set as an image extraction target area at the center portion of the image pickup portion 20i. The width of the center area 26a (the size in the line direction) is represented by Nm cells, and the width of a portion located at the line head side from the center area 26a and the width of a portion located at the line tail end side from the center area 26a are represented by Nh cells and Nt cells, respectively. Nh, Nm, Nt are equal to 1 or more. Furthermore, the height of the center area 26a (the size in the column direction) is represented by Mm lines, a portion of the image pickup portion 20i which is located at the storage portion 20s side from the center area 26a is represented by Mh lines, and a portion of the image pickup portion 20a which is located at the opposite side to the storage portion 20s with respect to the center area 26a is represented by Mt lines. Here, Mm lines over which the center area 26a serving as the image extraction area is disposed correspond to lines on which signal charges to be basically taken out exist, that is, extraction target lines. The extraction target line range may be set to any position in the height direction of the image pickup portion 20i, and Mh, Mt≧0. For example, Nh=Nm=Nt=N/3 and Mh=Mm=Mt=M/3, that is, the center area 26a may be set to a rectangular area at the center block when the image pickup portion 20i is divided into every three equal blocks in both the line and column directions, for example.

When a set exposure time elapses, the respective vertical CCD shift registers of the image pickup portion 20i and the storage portion 20s are driven by three-phase clocks $\phi_I$, $\phi_s$ to carry out frame transfer from the image pickup portion 20i to the storage portion 20s. The storage portion 20s is covered by light-shielding layer to prevent generation of charges due to incidence of light, so that the storage portion 20s can hold the signal charges which are frame-transferred from the image pickup portion 20i. The horizontal transfer portion 20h comprises CCD shift registers, and each of the bits thereof is connected to each output of the plural vertical CCD shift registers of the storage portion 20s. The signal charges of one frame which are held by the storage portion 20s are transferred to the horizontal transfer portion 20h line by line. The signal charges transferred to the horizontal transfer portion 20h are transferred to the output portion 20d by the horizontal transfer driving of the horizontal transfer portion 20h. The output portion 20d comprises an electrically-independent capacitor and an amplifier for taking out potential variation of the capacitor, and the signal charges output from the horizontal transfer portion 20h are received by the capacitor bit by bit to be converted to a voltage value, and then outputs the voltage value thus converted as a time-sequential image signal.

The operation of the image sensor 20 is controlled by a driving circuit 22. The driving circuit 22 is equipped with a timing control circuit 30 and a clock generating circuit 32. The timing control circuit 30 generates various kinds of trigger signals to the clock generating circuit 32 on the basis of a vertical synchronous signal VD and a horizontal synchronous signal HD. In response to the trigger signals from the timing control circuit 30, the clock generating circuit 32 generates vertical transfer clock signals $\phi_i$ ($\phi_{i1}$ to $\phi_{i3}$) to the image pickup portion 20i, vertical transfer clock signals $\phi_s$ ($\phi_{s1}$ to $\phi_{s3}$) to the storage portion 20s, a horizontal transfer clock signal $\phi_h$ to the horizontal transfer portion 20h, a reset pulse signal $\phi_r$ of the capacitor of the output portion 20d, etc., and outputs them to the respective parts.

The timing control circuit 30 is supplied with an image pickup mode signal MD indicating which the image pickup mode is a normal mode in which the image size to be picked up corresponds to the whole of the image pickup portion 20i or an image extraction mode in which the image size to be picked up corresponds to the center area 26a, and carries out a switching operation in accordance with the image pickup mode signal MD. When the signal MD indicates the normal mode, the timing control circuit 30 controls the clock generating circuit 32 so as to carry out a normal operation in which the image signal corresponding to each line of the image pickup portion 20i is output. On the other hand, when the signal MD indicates the image extraction mode, the timing control circuit 30 controls the clock generating circuit 32 so as to carry out the following operation.

The image signal output from the image sensor 20 is processed by a signal processing circuit 24. An analog signal processing circuit 34, an A/D conversion circuit 36 and a digital signal processing circuit 38 are shown as the constituent elements of the signal processing circuit 24 in FIG. 2. A signal processor (not shown) may be equipped at the rear stage of the digital signal processing circuit 38. The image signal thus signal-processed is displayed as an image on a display portion (not shown) or recorded in a semiconductor memory or other type of electromagnetic recording media in a recording portion (not shown).

An image signal $Y_0(t)$ output from the output portion 20d is first input to the analog signal processing circuit 34. The analog signal processing circuit 34 subjects the image signal $Y_0(t)$ to processing such as sample holding, automatic gain control (AGC), etc. to create an image signal $Y_1(t)$ in conformity with a predetermined format. The A/D conversion circuit 36 converts the image signal $Y_1(t)$ output from the analog signal processing circuit 34 to digital data, and outputs image data $D_1(n)$. The digital signal processing circuit 38 takes in the image data $D_1(n)$ from the A/D conversion circuit 36, and subjects the image data $D_1(n)$ to smear removal processing, edge correction, integration processing on a frame basis, and color balance control, filtering, etc. in the case of color images, thereby creating new image data $D_2(n)$. The image data $D_2(n)$ is supplied to another signal processor, a display portion and a recording portion.

FIG. 3 is a flowchart showing the method of driving the image sensor 20 in the image extraction mode, and FIG. 4 is a timing chart showing the driving method concerned.

Specifically, FIG. 4 shows the timing of the clock operation of the transfer clock signal $\phi_i$ applied to the vertical transfer electrode of the image pickup portion 20$i$, a transfer clock signal $\phi_s$ applied to the vertical transfer electrode of the storage portion 20$s$ and the transfer clock signal $\phi_h$ applied to the horizontal transfer electrode of the horizontal transfer portion 20$h$. In FIG. 4, the time elapses in the rightward direction of the abscissa axis.

In the case of image pickup of one frame, the image pickup portion 20$i$ is first exposed to light. The exposure term is controlled by operating a mechanical shutter or an electronic shutter. The mechanical shutter is disposed at the front face of the image pickup portion 20$i$, and the exposure term can be controlled by opening/closing the mechanical shutter. The electronic shutter operation is carried out by using an npn structure formed in the substrate depth direction. In the electronic shutter operation, the voltages applied to the vertical transfer electrode disposed on the surface of the substrate and the n-type substrate back surface are controlled, and signals accumulated at the substrate surface side are discharged to the substrate back surface through the npn structure. FIG. 4 shows a case where the exposure term is controlled by operating the electronic shutter, and at the exposure start timing, all of $\phi_{i1}$ to $\phi_{i3}$ are set to off for a predetermined term to carry out the electronic shutter operation (timing $\xi_1$). At the timing $\xi_1$, a clock signal having a predetermined phase of $\phi_i$, for example, $\phi_{i2}$ is set to on-state at the same time when the electronic shutter operation is completed, and a potential well is formed below the corresponding gate electrode of the image pickup portion 20$i$. The exposure term I is started from this timing (S50).

Immediately after the exposure term I is finished, the frame transfer from the image pickup portion 20$i$ to the storage portion 20$s$ is started (term Tf, S52). In this frame transfer, the clock generating circuit 32 generates mutually synchronous high-speed clocks as $\phi_i$, $\phi_s$ by cycles corresponding to the number of cells in the column direction of the image pickup portion 20$i$, whereby all the signal charges of all the cells of the image pickup portion 20$i$ are transferred to the storage portion 20$s$ having light shielding layer in a short period of time.

The signal charges of the respective cells frame-transferred to the storage portion 20$s$ are vertically transferred line by line by making the clock $\phi_s$ generate one cycle clock at plural timings $\xi_{2-i}$ (i=1, 2, 3, . . . ) of a predetermined period (line transfer S54). By one line transfer, the signal charges of one line are transferred from the storage portion 20$s$ to the horizontal transfer portion 20$h$. Every time the above transfer is carried out, the clock $\phi_h$ of the frequency fh is supplied from the clock generating circuit 32 to the horizontal transfer portion 20$h$ during a period Thi (i=1, 2, 3, . . . ), and the signal charges accumulated in the respective bits of the horizontal transfer portion 20$h$ are transferred to the output portion 20$d$ bit by bit (S56). The clock period fh of $\phi_h$ in the image extraction mode may be equal to that in the normal mode. Here, the difference point between the operation in the image extraction mode and the operation in the normal mode resides in the number of successively generated pulses of clock $\phi_h$.

That is, in the operation of one period of the horizontal transfer, all the bits of the horizontal transfer portion 20$h$ are sequentially read out to the output portion 20$d$ in the normal mode. On the other hand, in the image extraction mode, the bits are read out till the bit of the horizontal transfer portion 20$h$ which corresponds to the cell (the (Nh+Nm)-th cell from the line head) at the rear end of the Nm cells on which the image extraction target area is disposed, or till the bit corresponding to some midpoint of the Nt cells at the line tail side located subsequently from the image extraction target area. Accordingly, at the time point when the horizontal transfer of the signal charges of the i-th line is completed, the signal charges at the tail side of the i-th line remain at the portion of the head side of the horizontal transfer portion 20$h$. Specifically, for the term Thi, the signal charges of the cells of N-min(Nh, Nt) from the head on one line are read out to the output portion 20$d$, and the remaining signal charges of min(Nh, Nt) cells at the head side remain at the head bit of the horizontal transfer portion 20$h$. In this embodiment in which the center area 26$a$ occupying a central ⅓ part of one line corresponds to the image extraction target area, Nh=Nm=Nt=N/3 as described above. Therefore, in one horizontal transfer period, 2N/3 bits are read out from the head, and N/3 of the line tail side are left at the head side of the horizontal transfer portion 20$h$.

For example, when the signal charges of the first line are transferred to the horizontal transfer portion 20$h$ (timing $\xi_{2-1}$, S54) and the horizontal transfer operation for the term Th1 is completed, the signal charges of the min(Nh, Nt) cell at the line tail side of the first line remain at the head bit of the horizontal transfer portion 20$h$ (S56). Under this state, the signal charges of the second line are transferred to the horizontal transfer portion 20$h$ ($\xi_{2-2}$, S54), the signal charges at the line tail side of the first line and the signal charges at the line head side of the second line are combined with each other at the head min(Nt, Nt) bit of the horizontal transfer portion 20$h$.

Here, since the number of bits to remain is set to min(Nh, Nt) satisfying a condition of not more than Nh and not more than Nt, the signal charges combined in the horizontal transfer portion 20$h$ are signal charges unnecessary in the image extraction mode (that is, the signal charges at the line head side and the line tail side located out of the image extraction target area). On the other hand, the signal charges of the image extraction target area which are needed in the image extraction mode are not combined with signals charges of other lines, and converted to $Y_0(t)$ and read out in the output portion 20$d$ within each horizontal transfer period.

Figure 5A:
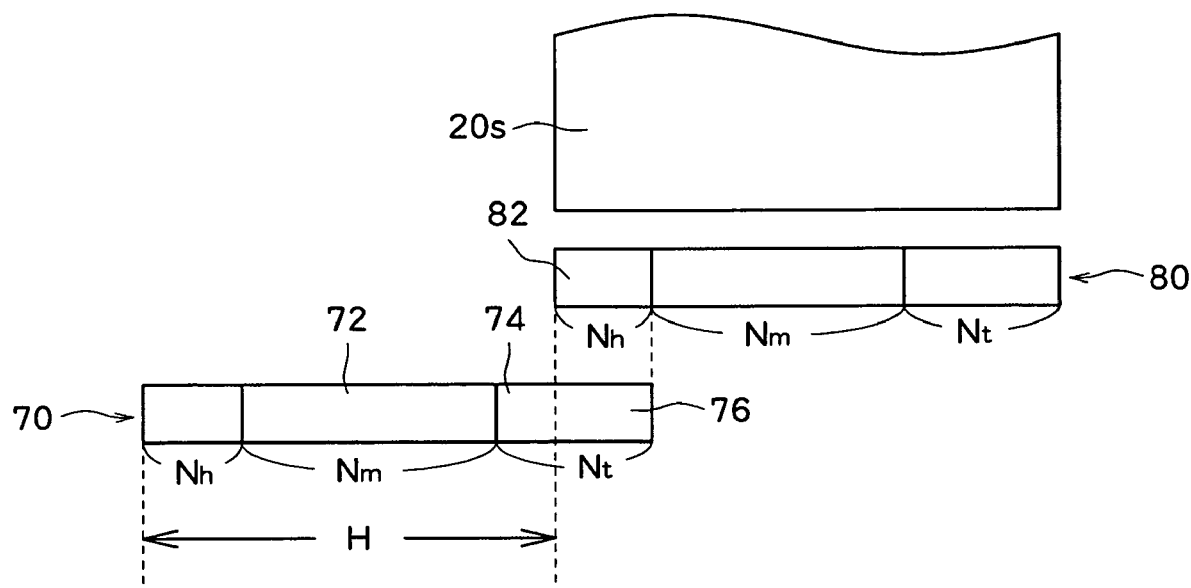
FIG. 5A is a diagram showing horizontal transfer in the case of Nh<Nt.
Figure 5B:
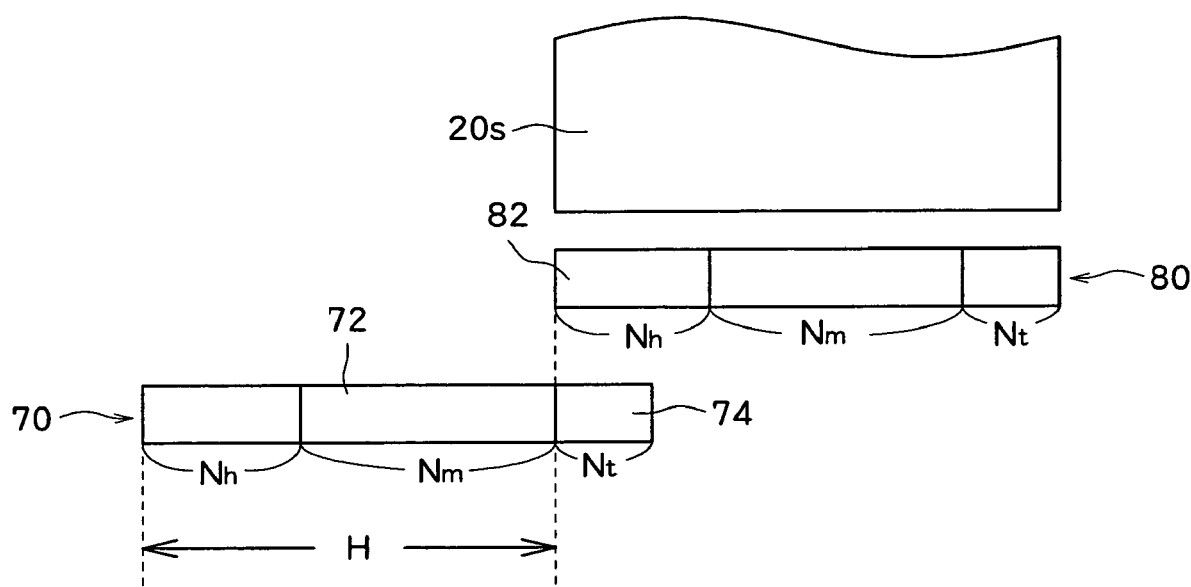
FIG. 5B is a diagram showing horizontal transfer in the case of Nh≧Nt.

As in the case of the first and second lines, on any i-th line and an (i+1)-th line, unnecessary signal charges of a line tail side of a preceding line and unnecessary signal charges of a line head of a subsequent line are combined with each other, and discharged from the horizontal transfer portion 20$h$. FIG. 5A and FIG. 5B are schematic diagrams showing the composition of the signal charges described above.

In the case of Nh<Nt shown in FIG. 5A, the signal charges are read out until some midpoint of a line tail portion 74 (Nt bit) in a horizontal transfer period H with respect to a signal charge group 70 of the i-th line. At this time point, the horizontal transfer of the i-th line is stopped, and a tail portion 76 corresponding to a part (Nh bit) of the line tail portion 74 of the i-th line remains in the horizontal transfer portion 20$h$. A signal charge group 80 of the (i+1)-th line is transferred to the horizontal transfer portion 20$h$, and a head portion 82 of the (i+1)-th line is combined with the remaining tail portion 76 of the i-th line. In the case of Nh≧Nt, as shown in FIG. 5B, the horizontal transfer is stopped at the time point when the extraction target portion 72 is discharged from the horizontal transfer portion 20$h$, and the overall line tail portion 74 is combined with a part of the head portion 82 of the next line. Particularly in the case of Nh=Nt, the line tail portion 74 of th i-th line and the head portion 82 of the (i+1)-th can be overlapped in the overall range thereof.

This horizontal transfer is repeated until the last line (M-th line) of one frame (S58). With respect to the last line, the horizontal transfer may be stopped at some midpoint of the line or the overall horizontal transfer may be carried out as in the case of the other lines. When the horizontal transfer is stopped at some midpoint, remaining unnecessary signal charges are combined with unnecessary signal charges at the head of the first line of the next frame and discharged. In the above construction, in order to simplify the construction of the clock generating circuit 32, the processing of overlapping the line tail of the preceding line and the line head of the subsequent line is carried out for lines other than the extraction target lines as in the same manner as the extraction target lines. However, with respect to the lines other than the extraction target lines, the whole of one line contains unnecessary signal charges, and thus the overlap width between the preceding line and the subsequent line may be made larger than the extraction target lines. For examples, with respect to the lines other than the extraction target lines, the last half of the preceding line and the first half of the subsequent line may be overlapped with each other.

As described above, in the image extraction mode, a part of one line with respect to the extraction target lines is read out by the horizontal transfer portion 20h while being overlapped with the adjacent line, whereby the horizontal transfer period Th per line can be more greatly shortened than that in the normal mode, which can enhance the frame rate. When the ⅓ line center described above is the center area 26a, the number of clocks of $\phi_h$ required for the horizontal transfer may be reduced to ⅔ of the normal mode per line.

Furthermore, the center area 26a is located from the (Mh+1)-th line to the (Mh+Mm)-th line, and it is unnecessary to read out the signal charges of the last Mt line subsequent to the center area 26a in the image extraction mode. Here, after the horizontal transfer operation described above is carried out until the read-out of the (Mh+Mm)-th line is completed, $\phi_s$ may be controlled to carry out the same operation as the electronic shutter on the storage portion 20s and discharge the signal charges of the last Mt line remaining in the storage portion 20s irrespective of the horizontal transfer. This can further enhances the frame rate. For example, when the center area 26a is disposed at the center ⅓ part in the line direction and the column direction of the frame on which cells are arranged on M lines and N columns, the number of clocks of $\phi_h$ required to discharge the signal charges of one frame are equal to 4MN/9 times, that is, it may be reduced to 4/9 of the normal mode.

What is claimed is:

1. A solid-state image pickup device driving method of reading out from a solid-state image pickup device image information of at least one image extraction target area set in an image pickup area of the solid-state image pickup device, comprising:

a line transfer step of vertically transferring signal charges of each of photosensitive pixels arranged in a matrix form in the image pickup area by plural vertical shift registers, and transferring the signal charges from the plural vertical shift registers to a horizontal shift register line by line; and a horizontal transfer step of horizontally transferring the signal charges transferred to the horizontal shift register, wherein with respect to plural extraction target lines which are traverse over the image extraction target area and each of which comprises an extraction target section corresponding to an overlap portion with the image extraction target area, a preceding section preceding to the extraction target section and a subsequent section subsequent to the extraction target section, the horizontal transfer step is stopped while leaving the signal charges of a hold section corresponding to at least a part of the subsequent section in the horizontal shift register, the vertical transfer step vertically transfers a subsequent extraction target line to the horizontal shift register in which the signal charges of the hold section of a preceding extraction target line remain at the head portion, and a length of the hold section is determined on the basis of a length of shorter one of the subsequent section of the preceding extraction target line and the preceding section of the subsequent extraction target line.

2. The driving method according to the claim 1, wherein the length of the hold section is set to the length of shorter one of the subsequent section of the preceding extraction target lines and the preceding section of the subsequent extraction target lines.

3. The driving method according to claim 1, wherein the plural extraction target lines corresponding to the common image extraction target area contain preceding sections having the same length and subsequent sections having the same length.

4. The driving method according to claim 3, wherein the preceding section and the subsequent section are equal to each other in length.

5. The driving method according to claim 1, wherein with respect to lines other than the extraction target lines, the horizontal transfer step is stopped while the signal charges of a last half section of a preceding line are left in the horizontal shift register, and the vertical transfer step vertically transfers a subsequent line to the horizontal shift register in which the signal charges of the last half section of the preceding line are left at the head portion.

6. The driving method according to claim 1, further comprising a collectively discharging step in which after all the extraction target lines of the overall image corresponding to the image pickup area are read out, the signal charges of the residual lines of the overall image concerned are collectively discharged from the solid-state image pickup by an electronic shutter operation.

* * * * *